(12) United States Patent
Pruess et al.

(10) Patent No.: US 12,351,018 B2
(45) Date of Patent: Jul. 8, 2025

(54) HYDRAULIC CONNECTION

(71) Applicant: Caterpillar Inc., Peoria, IL (US)

(72) Inventors: Christopher William Pruess, Dunlap, IL (US); John Martin Seipold, Peoria, IL (US); Jeremiah Christopher Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 388 days.

(21) Appl. No.: 17/590,155

(22) Filed: Feb. 1, 2022

(65) Prior Publication Data
US 2023/0241967 A1    Aug. 3, 2023

(51) Int. Cl.
*B60K 17/10* (2006.01)
*F16H 39/14* (2006.01)
*F16H 61/437* (2010.01)

(52) U.S. Cl.
CPC .......... *B60K 17/105* (2013.01); *F16H 39/14* (2013.01); *F16H 61/437* (2013.01)

(58) Field of Classification Search
CPC ....... B60K 17/105; F16H 39/14; F16H 39/04; F16H 61/437; F16H 57/0424; F16H 57/0471; F16H 57/02; F16H 57/029; F16H 57/0417
See application file for complete search history.

(56) References Cited

U.S. PATENT DOCUMENTS

| | | |
|---|---|---|
| 3,764,233 A | 10/1973 | Strickland |
| 4,258,548 A | 3/1981 | Hall, III et al. |
| 4,627,237 A | 12/1986 | Hutson |
| 6,263,670 B1 | 7/2001 | Gluck et al. |
| 6,588,206 B1 | 7/2003 | Hauser et al. |
| 6,672,058 B1 | 1/2004 | Langenfeld et al. |
| 6,837,047 B2 | 1/2005 | Dong et al. |
| 8,347,620 B2 | 1/2013 | Yu et al. |
| 9,488,261 B2 | 11/2016 | Mochizuki et al. |
| 9,605,756 B1 * | 3/2017 | Maiyur ................. E02F 9/2296 |
| 10,935,117 B1 | 3/2021 | Bennett |
| 2010/0146960 A1 * | 6/2010 | Calvert .................... F16H 47/04 60/487 |
| 2015/0068824 A1 * | 3/2015 | Matsuura ............. B60K 17/105 180/53.4 |
| 2017/0101100 A1 * | 4/2017 | Lister ...................... F16H 47/04 |
| 2017/0158187 A1 * | 6/2017 | Calvert .................... B60K 6/12 |

(Continued)

*Primary Examiner* — Farhana Pervin
(74) *Attorney, Agent, or Firm* — XSensus (57) ABSTRACT

Disclosed is a system comprising a variator and a transmission. The transmission housing includes a mounting joint transmission face and one or more transmission ports disposed in the mounting joint transmission face that are fluidly connected in a one-to-one correspondence to one or more transmission channels in the transmission housing. The variator housing may comprise a mounting joint variator face coupled to the mounting joint transmission face and one or more variator ports disposed in the mounting joint variator face. The one or more variator ports may be fluidly connected in a one-to-one correspondence to one or more variator channels in the variator housing. The one or more variator ports are fluidly connected in a one-to-one correspondence to the one or more transmission ports without the use of one or more external hoses to fluidly connect the one or more variator ports to the one or more transmission ports.

20 Claims, 7 Drawing Sheets

(56) References Cited

U.S. PATENT DOCUMENTS

| | | | |
|---|---|---|---|
| 2017/0248217 A1* | 8/2017 | Cronin | F16H 47/04 |
| 2018/0258963 A1* | 9/2018 | Carl | F15B 15/12 |
| 2022/0205530 A1* | 6/2022 | Ishikawa | H02K 9/19 |
| 2022/0316178 A1* | 10/2022 | Shinozaki | F16H 57/0424 |
| 2023/0082913 A1* | 3/2023 | Nakamatsu | F16H 57/021 |
| | | | 475/84 |
| 2023/0110432 A1* | 4/2023 | Laforce | H02K 7/116 |
| | | | 310/54 |

* cited by examiner

HYDRAULIC CONNECTION

TECHNICAL FIELD

The present disclosure relates generally to systems having hydraulic connections and, more particularly, to a power split transmission system that includes a hydrostatic variator fluidly connected to a transmission.

Background

A hydrostatic transmission system requires external hydraulic connections to be made to the pump(s) and motor(s) comprising the system. One application of a hydrostatic transmission is as a variator providing infinitely variable range capability to a power split or continuously variable transmission (CVT).

Conventionally, fluid connections to the variator are made via hoses or tubes with multiple fittings. Such connection may include fluid connections for control or pilot supply, makeup supply, flushing discharge and lubrication supply for the pumps/motors of the variator. The hoses/tubes of such fluid lines not only add cost and complexity to assembly but, with normal wear and tear over time, add potential leakage points.

U.S. Pat. No. 10,935,117 that issued Mar. 2, 2021 ("the '117 Patent") discloses a hydrostatic transmission assembly that includes a first housing member and a housing cap sealed to the first housing member to form a sump wherein a pump and motor are rotatably disposed. A pump mount is located in the sump and engaged to the housing cap. The housing cap also includes a motor mount for an axial piston motor, and hydraulic fluid passages for connecting the pump to the motor. A pocket is located in the housing cap to rotationally support a swash plate for the pump.

SUMMARY OF THE DISCLOSURE

In one aspect of the present disclosure, a system is disclosed. The system may comprise a gear box and a hydraulic machine fluidly connected to the gear box by a working fluid circuit. The gear box includes a gear box housing. The gear box housing may include a mounting joint gear box face and one or more gear box ports disposed in the mounting joint gear box face. The one or more gear box ports may be fluidly connected in a one-to-one correspondence to one or more gear box channels integral to the gear box housing. The hydraulic machine may include a hydraulic machine housing that may comprise a mounting joint hydraulic machine face coupled to the mounting joint gear box face and one or more hydraulic machine ports disposed in the mounting joint hydraulic machine face. The one or more hydraulic machine ports may be fluidly connected in a one-to-one correspondence to one or more hydraulic machine channels integral to the hydraulic machine housing. The one or more hydraulic machine ports are fluidly connected in a one-to-one correspondence to the one or more gear box ports without the use of one or more external hoses to fluidly connect the one or more hydraulic machine ports to the one or more gear box ports.

In another aspect of the present disclosure, a variator including a variator housing is disclosed. The variator housing may include a mounting joint variator face configured to be coupled to a mounting joint transmission face of a transmission and a plurality of variator ports disposed in the mounting joint variator face. The plurality of variator ports may be fluidly connected in a one-to-one correspondence to a plurality of variator channels integral to the variator housing. The plurality of variator ports are configured to be fluidly connected in a one-to-one correspondence to a plurality of transmission ports in the mounting joint transmission face without the use of external hoses to fluidly connect the variator ports to the transmission ports.

In a further aspect of the present disclosure, a transmission is disclosed. The transmission includes a transmission housing. The transmission housing may include a mounting joint transmission face configured to be coupled to a mounting joint variator face of a variator, a plurality of seal grooves disposed in the mounting joint transmission face, a plurality of transmission ports disposed in a one-to-one correspondence in the plurality of seal grooves, and a plurality of seal members disposed in a one-to-one correspondence in the plurality of seal grooves. Each seal member is configured to seal an interface between one of the plurality of transmission ports and one of the plurality of variator ports. The plurality of transmission ports may be fluidly connected in a one-to-one correspondence to a plurality of transmission channels integral to the transmission housing. The plurality of transmission ports are configured to be fluidly connected in a one-to-one correspondence to a plurality of variator ports in the mounting joint variator face without the use of external hoses to fluidly connect the transmission ports to the variator ports.

Additional aspects are defined by the claims of this patent.

DETAILED DESCRIPTION

Figure 1:
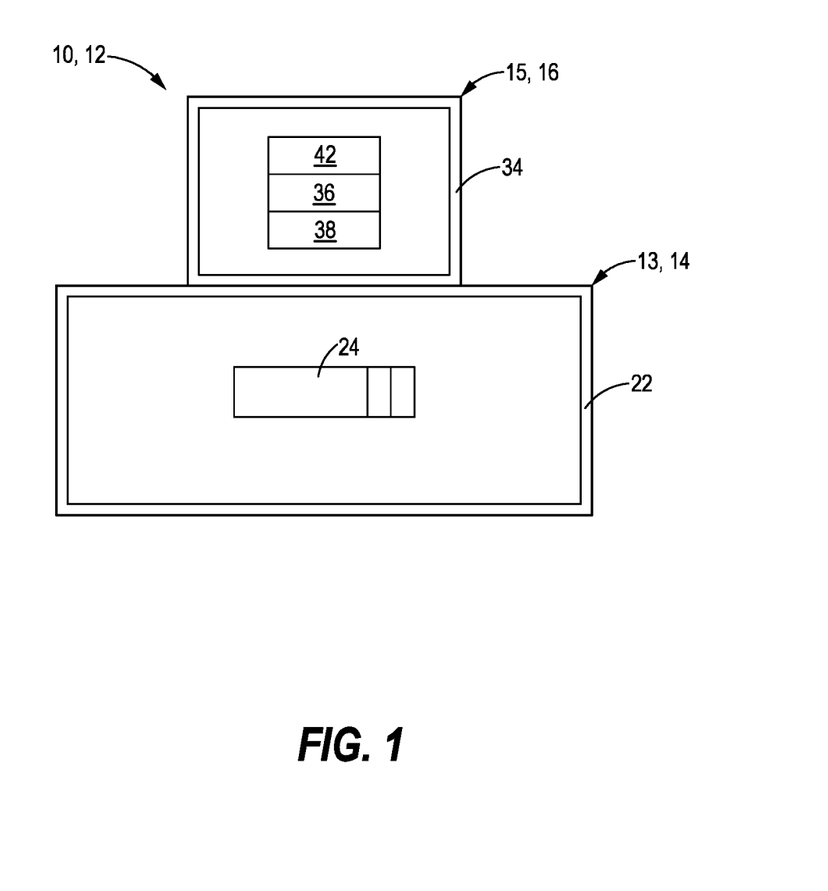
FIG. 1 is a schematic illustration of an exemplary system in accordance with the present disclosure.

A system 10 comprising two members fluidly connected is disclosed herein. An exemplary system 10 is shown schematically in FIG. 1 and comprises a gear box 13 coupled to a hydraulic machine 15 according to the teachings herein. More specifically, in FIG. 1, the exemplary system 10 may be a power split transmission system 12 that comprises a gear box 13 that includes or may be a transmission 14, and a hydraulic machine 15 that includes or may be a variator 16. The variator 16 is coupled to the transmission 14 by fasteners 18 (best seen in FIGS. 2-3). The gear box 13 (in the exemplary embodiment, a transmission 14) and the hydraulic machine 15 (in the exemplary embodiment a variator 16) are operably connected via a working fluid circuit 20, a portion of which is shown in FIG. 4.

In the exemplary embodiment, the transmission 14 is a multi-speed gearbox configured to provide a range of transmission ratios. Such a transmission may also be known by those of skill in the art as a planetary differential with multiple discrete forward and reverse gear ratios.

Figure 2:
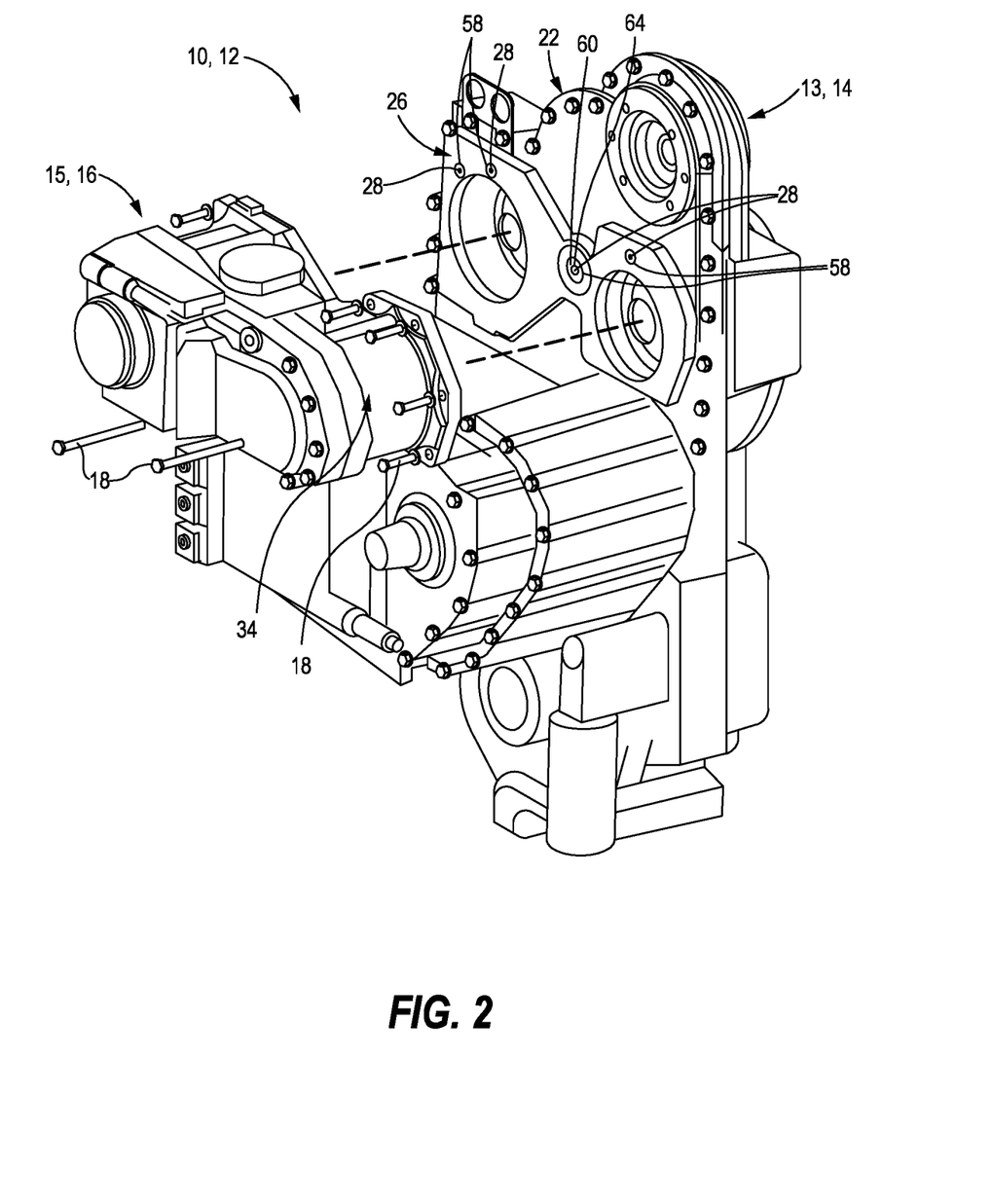
FIG. 2 is an exploded perspective view of the transmission and variator of the exemplary embodiment of FIG. 1.
Figure 3:
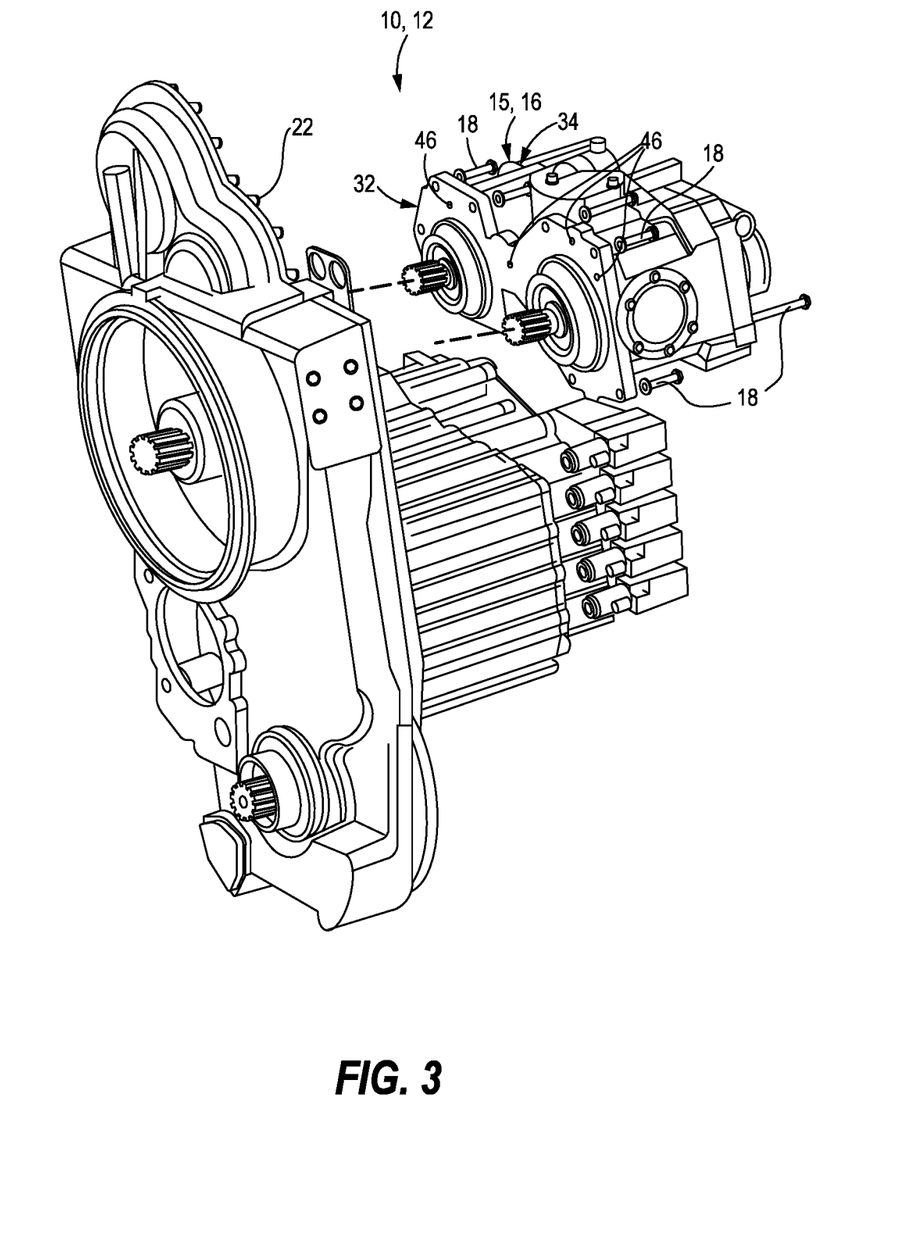
FIG. 3 another exploded perspective view of the transmission and variator of the exemplary embodiment of FIG. 2.
Figure 4:
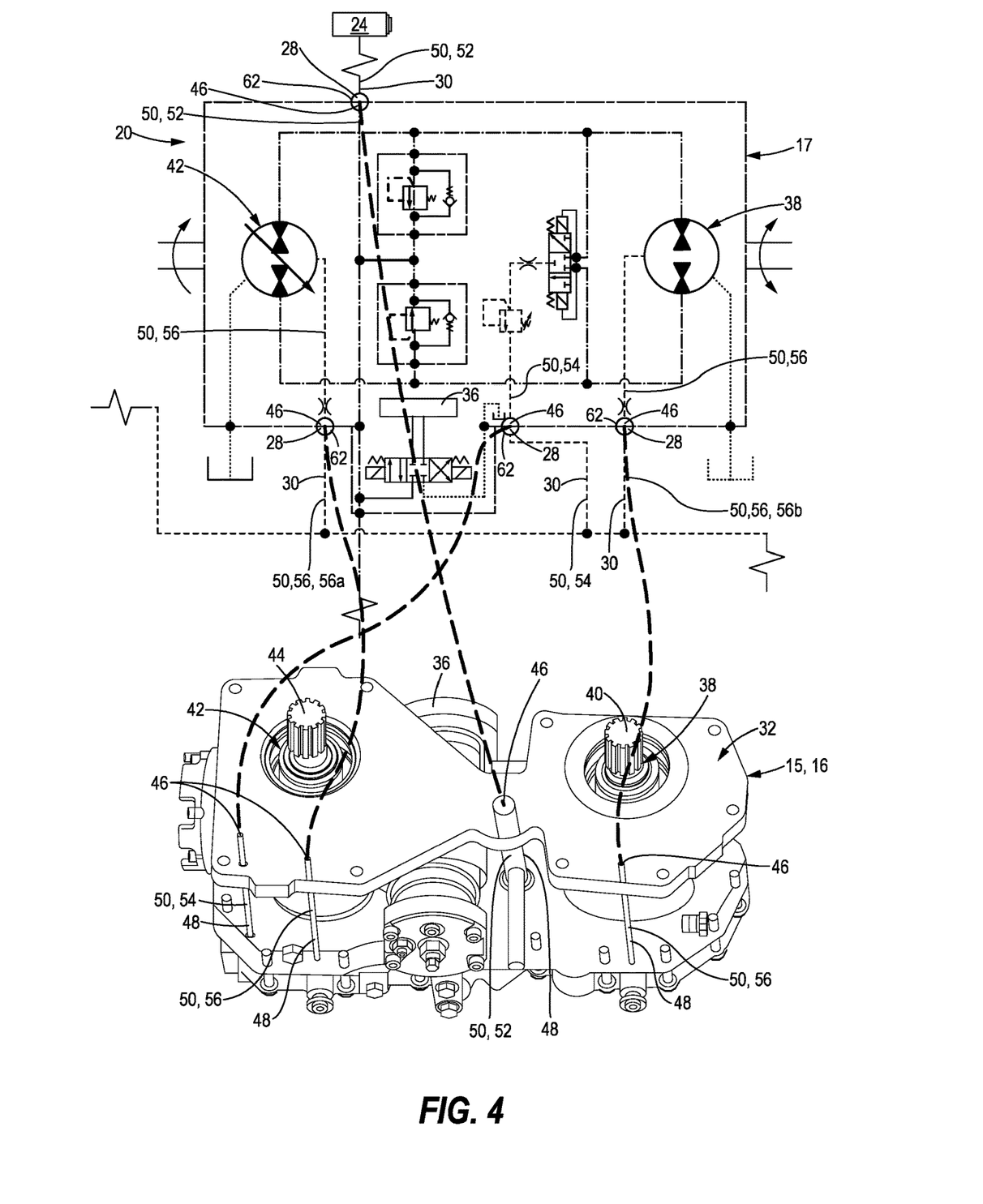
FIG. 4 illustrates the variator of FIGS. 2-3 with a portion of the variator housing removed and illustrates a portion of the working fluid circuit for the exemplary hydrostatic transmission system of FIGS. 1-3.

As noted above, the variator 16 is coupled or mounted to the transmission 14 by one or more fasteners 18, which can be best seen on FIGS. 2-3. FIGS. 2-3 illustrate an exploded view of the transmission 14 and variator 16 of the exemplary power split transmission system 12. The fasteners 18 may include, but are not limited to, bolts, screws, or the like. As is known in the art, the variator 16 is configured to drive the transmission 14 (e.g., a CVT) to provide smooth transitions through gearing ranges.

The transmission 14 includes a transmission housing 22. The transmission 14 may further include one or more clutch members 24 (FIG. 1) configured to select discrete gear ratios and transmission output rotation direction. The clutch members 24 in the exemplary embodiment are fluidly connected to the control and makeup supply fluid passageway 52 (see FIG. 4).

The transmission housing 22 (FIG. 2) includes a mounting joint transmission face 26, one or more transmission ports 28 disposed in the mounting joint transmission face 26 and extending therethrough, and one or more transmission channels 30 (FIG. 4).

The mounting joint transmission face 26 (FIG. 2) is configured to receive a mounting joint variator face 32 (FIG. 3) of the variator 16. More specifically, as shown in FIGS. 2-3, the mounting joint transmission face 26 is coupled to the mounting joint variator face 32 by the one or more fasteners 18.

Figure 5:
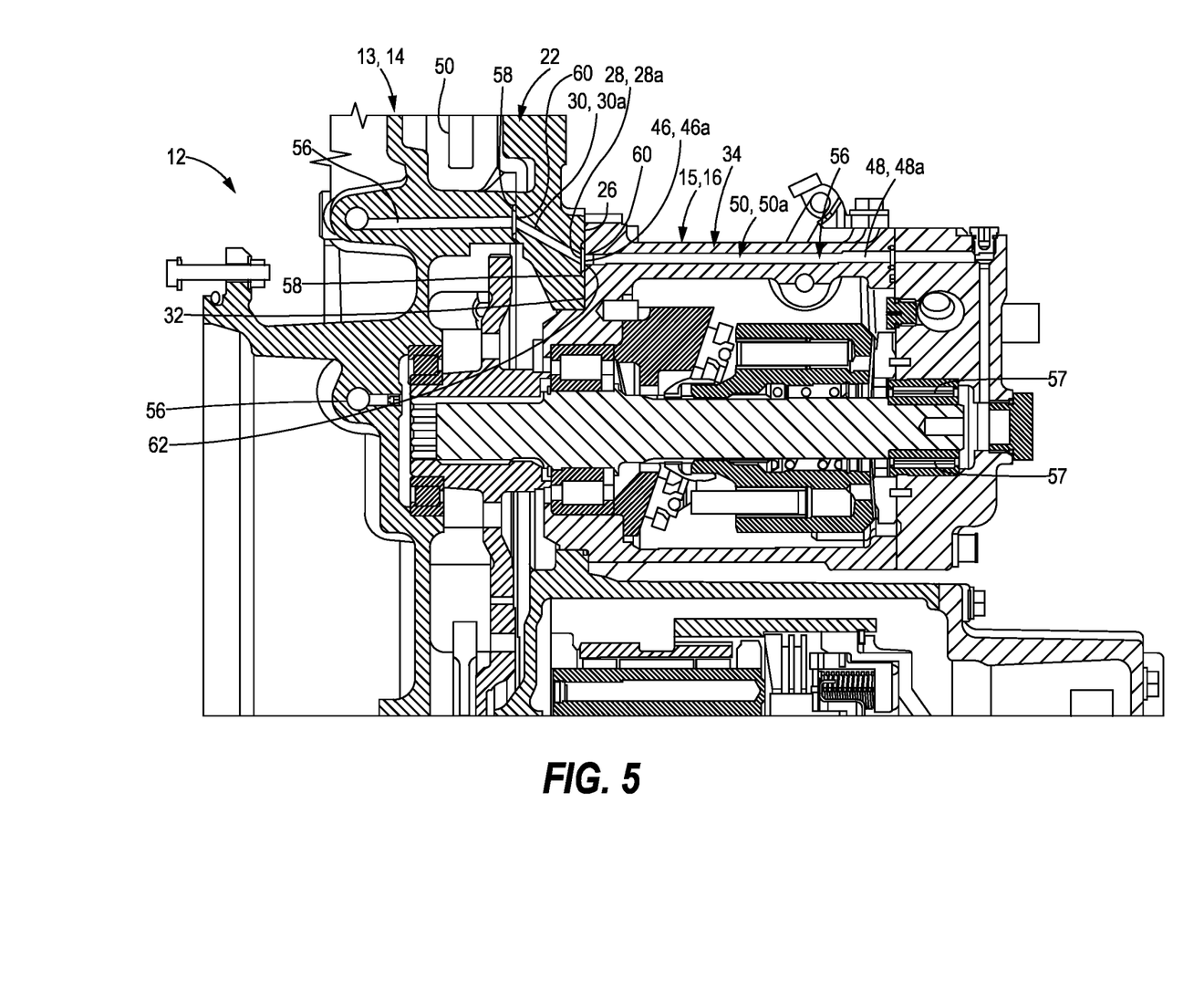
FIG. 5 is a sectional view of a portion of the exemplary power split transmission system of FIG. 2-3.

The one or more transmission ports 28 (best seen in FIG. 2) may be fluidly connected in a one-to-one correspondence to the one or more transmission channels 30 (FIGS. 4-7). The transmission channels 30 may be entirely or partially integral to the transmission housing 22. FIG. 5 is a sectional view of a portion of the exemplary power split transmission system 12. FIG. 5 illustrates one of the plurality of transmission ports 28 that is fluidly connected to a transmission channel 30 that is integral to the transmission housing 22. The working fluid circuit 20 (FIG. 4) includes the transmission channels 30.

The variator 16 may include a variator housing 34 (FIGS. 2-3). Turning now to FIG. 4, FIG. 4 illustrates, in part, the variator 16 with a portion of the variator housing 34 removed so that internal components and the (internal) variator channels 48 may be more clearly seen. In the exemplary embodiment, the variator 16 may further include an actuator 36, a motor 38 that includes a motor shaft 40, and a pump 42 that includes a pump shaft 44.

The actuator 36 is configured to activate/deactivate the pump 42, which is mechanically connected to the actuator 36. The pump 42 may be a hydraulic pump (e.g., a variable displacement pump). In other embodiments, the actuator 36 may be (or may also be) mechanically connected to the motor 38 and configured to activate/deactivate the motor 38. The motor 38 may be a hydraulic motor. The actuator 36, motor 38 and pump 42 are operably fluidly connected to the working fluid circuit 20. Shown schematically in FIG. 4 is the correspondence between the working fluid circuit 20 and the variator 16. In the schematic of the working fluid circuit 20 the portion of the working fluid circuit 20 disposed in the variator 16 in shown inside the broken line 17.

The variator housing 34 (FIG. 3) includes the mounting joint variator face 32 (best seen in FIG. 4), one or more variator ports 46 disposed in the mounting joint variator face 32, and one or more variator channels 48 (FIGS. 4-7). The variator channels 48 may be entirely or partially integral to the variator housing 34. FIG. 5 illustrates one of the plurality of variator ports 46 that is fluidly connected to a variator channel 48 that is integral to the variator housing 34. As can be seen in FIG. 4, the working fluid circuit 20 includes the variator channels 48.

Figure 6:
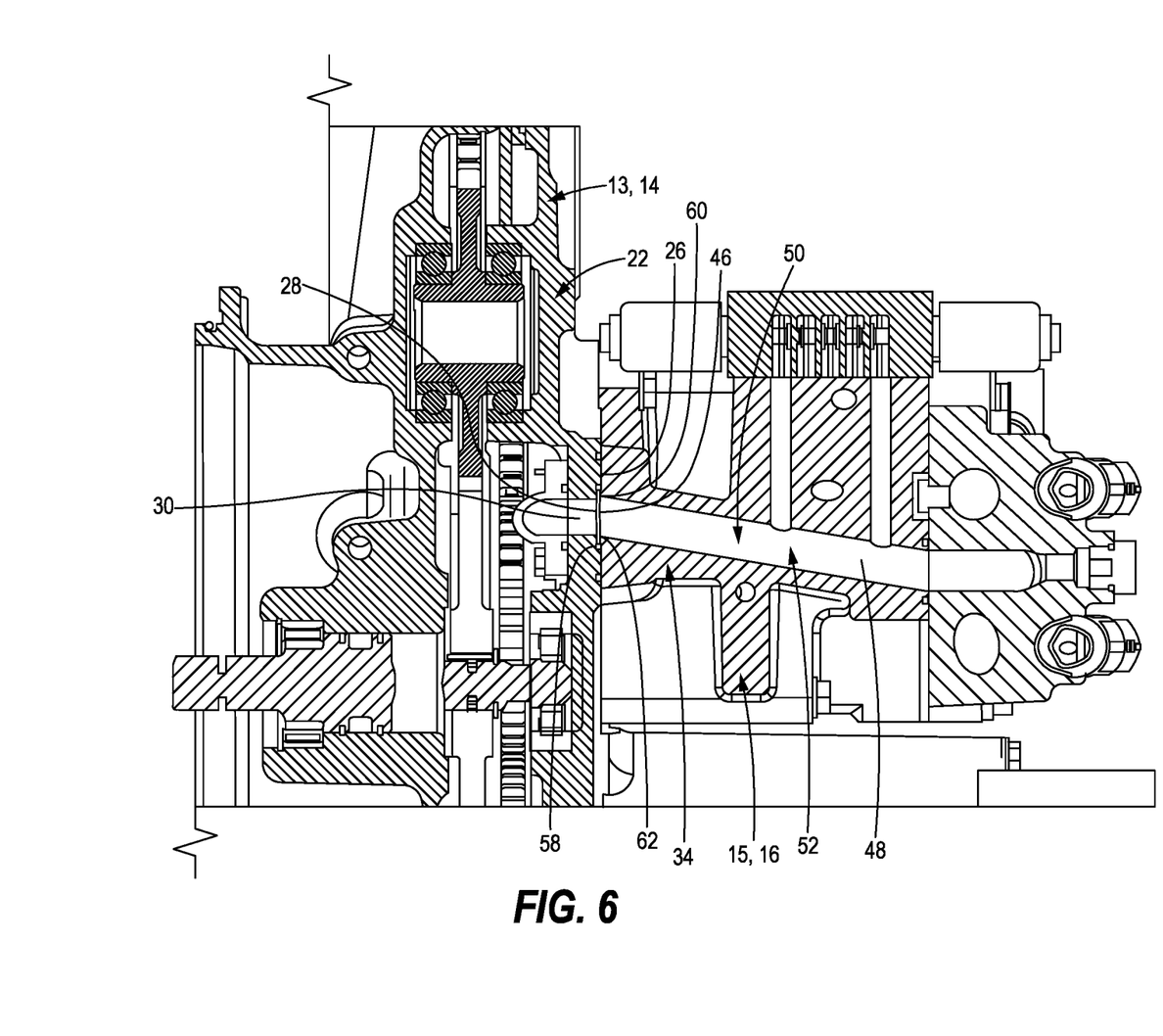
FIG. 6 is a sectional view of another portion of the exemplary power split transmission system of FIGS. 2-3.
Figure 7:
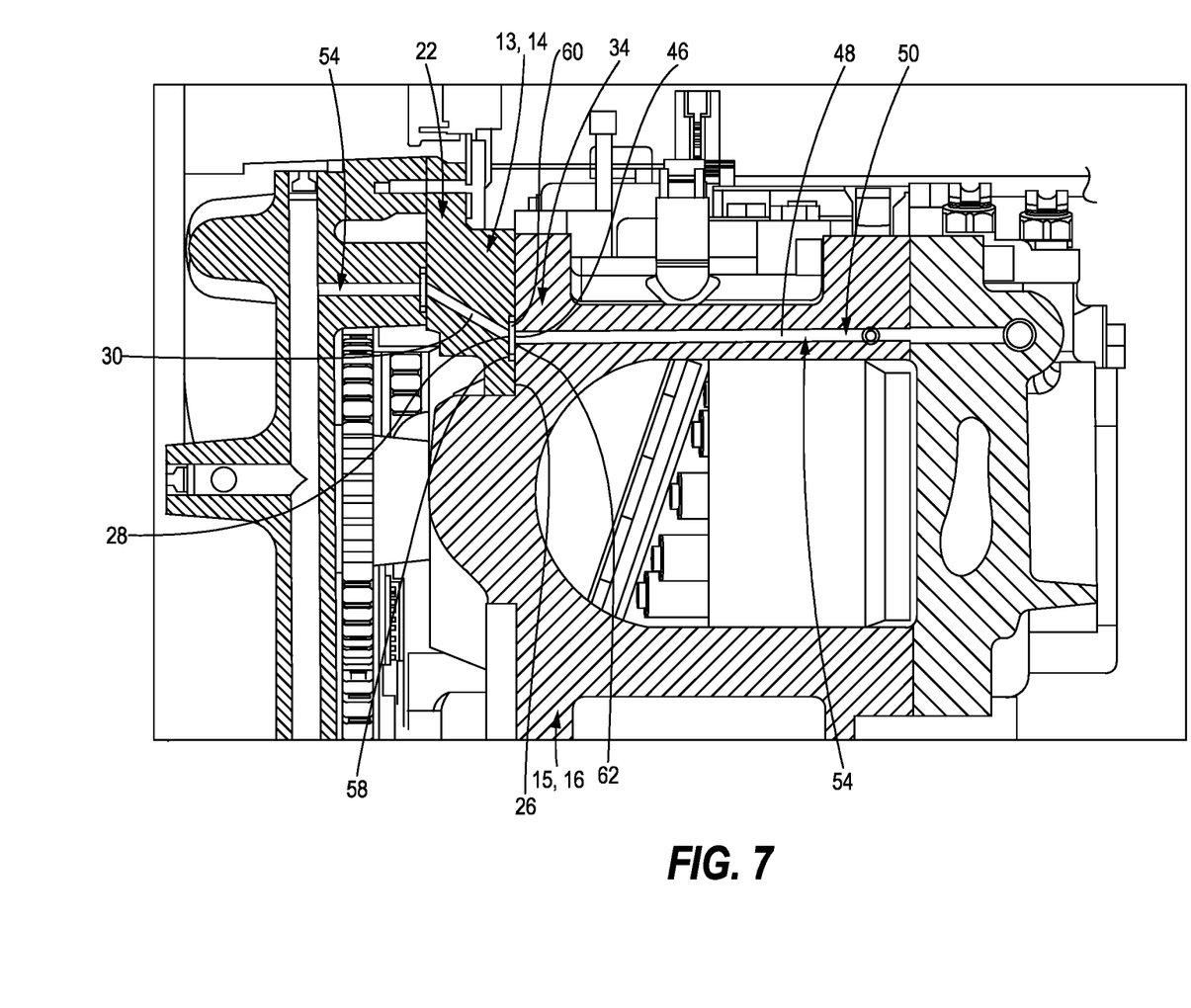
FIG. 7 is a sectional view of another portion of the exemplary power split transmission system of FIGS. 2-3.

The mounting joint variator face 32 is configured to be coupled to the mounting joint transmission face 26 (FIG. 2). The one or more variator ports 46 are fluidly connected in a one-to-one correspondence to the one or more variator channels 48 (FIGS. 5-7). The one or more variator ports 46 are fluidly connected in a one-to-one correspondence to the one or more transmission ports 28 without the use of external hoses or external tubes or the like (collectively, "hoses").

When the mounting joint variator face 32 (FIG. 3) is coupled to the mounting joint transmission face 26 (FIG. 2), a plurality of fluid passageways 50 (best seen in FIGS. 5-7) are formed that are each configured to conduct fluid between the transmission 14 and the variator 16. Each fluid passageway 50 comprises a variator channel 48, a variator port 46, a transmission port 28 and a transmission channel 30. For example, as shown in FIG. 5, a first fluid passageway 50a is formed when a first transmission port 28a and a first variator port 46a are aligned and fluidly connected. The first fluid passageway 50a comprises the first transmission channel 30a that is fluidly connected to the first transmission port 28a, the first transmission port 28a, the variator port 46a and the first variator channel 48a that is fluidly connected to the first variator port 46a. The one or more fluid passageways 50 may include, but is not limited to, one or more of the following: a control passageway, a makeup supply passageway, a flushing discharge passageway, a lubrication supply passageway, and a cooling supply passageway. In some embodiments, the control passageway and the makeup passageway may be combined into a single fluid passageway 50, and/or the lubrication supply passageway and the cooling supply passageway may be combined into a single fluid passageway 50.

As can be seen best in the working fluid circuit 20 of FIG. 4, in the exemplary embodiment, the plurality of fluid passageways 50 include a control and makeup supply fluid passageway 52, a flushing fluid passageway 54 and a first bearing lube and cooling fluid passageway 56 and a second bearing lube and cooling fluid passageway 56.

In the exemplary embodiment, the control and makeup supply fluid passageway 52 is configured to conduct flow of fluid to the variator 16 to replenish fluid (replenishment of fluid) in the working fluid circuit 20 that has been lost due to leakage or the like (to makeup for lost/leaked fluid).

The control and makeup supply fluid passageway 52 is further configured to conduct fluid in the variator 16 to provide actuation control flow for the actuator 36 (which is mechanically connected to the pump 42 and/or motor 38).

The control and makeup supply fluid passageway 52 is further configured to conduct fluid from the variator 16 to the transmission 14 for control flow of actuation (by fluid flow or pressure) of mechanical clutch members 24 in the transmission 14. In the exemplary embodiment, fluid not consumed as makeup supply (to the working fluid circuit 20 to replenish leaked fluid) and actuation control for the actuator 36, is utilized to supply actuation pressure for actuation of the (mechanical) clutch members 24 in the transmission 14.

FIG. 6 is a sectional view of a portion of the exemplary power split transmission system 12. FIG. 6 illustrates a portion of the control and makeup supply fluid passageway 52. The control and makeup supply fluid passageway 52 comprises the transmission channel 30 that is fluidly connected to the transmission port 28, the transmission port 28, the variator port 46 and the variator channel 48 that is fluidly connected to the first variator port 46.

In the exemplary embodiment, the bearing lube and cooling fluid passageway 56 is configured to conduct fluid from the transmission 14 to the variator 16 for lubrication of one or more bearings 57 (e.g., the bearings 57 operably coupled to the motor shaft 40 or pump shaft 44) and cooling of the variator housing 34 (e.g., disposed adjacent to the pump 42/motor 38). In the exemplary embodiment, there is shown in the working fluid circuit 20 of FIG. 4, a first bearing lube and cooling fluid passageway 56a, and a second bearing lube and cooling fluid passageway 56b.

The flushing fluid passageway 54 (FIG. 4) is configured to conduct fluid that has been removed from the working fluid circuit 20 (to be replaced by cooler makeup flow). In the exemplary embodiment, the fluid removed is returned (from the variator 16) to the transmission 14 for use by a lubrication circuit (not shown) or the like.

FIG. 7 is a sectional view of a portion of the exemplary power split transmission system 12. FIG. 7 illustrates a portion of the flushing fluid passageway 54. The flushing fluid passageway 54 comprises the transmission channel 30 that is fluidly connected to the transmission port 28, the transmission port 28, the variator port 46 and the variator channel 48 that is fluidly connected to the first variator port 46.

A plurality of seal grooves 58 (see FIG. 2) may be disposed in either the mounting joint transmission face 26 or the mounting joint variator face 32. Each seal groove 58 is configured to receive a seal member 60 (see FIGS. 5-7). The seal grooves 58 may be annular in shape or any other appropriate shape to retain the seal member 60 in place. In the exemplary embodiments shown in FIGS. 5-7, the seal grooves 58 are each disposed in the mounting joint transmission face 26. The depth of each of the seal grooves 58 may be configured so that a top of a seal member 60 is flush with the mounting joint transmission face 26 when the seal member 60 is disposed (around the transmission port 28) in a seal groove 58 in the mounting joint transmission face 26. Alternatively, the seal grooves 58 may each be disposed in the mounting joint variator face 32. In such an alternative embodiment, the depth of each of the seal grooves 58 may be configured so that a top of a seal member 60 is flush with the mounting joint variator face 32 when the seal member 60 is disposed (around the variator port 46) in a seal groove 58 in a mounting joint variator face 32. As shown in FIGS. 5-7, each seal member 60 is configured to seal an interface 62 between the transmission port 28 and the variator port 46. Each seal member 60 may be disposed in a seal groove 58. Each seal member 60 has an opening 64 (best seen in FIG. 2) in which the transmission port 28 or variator port 46 is disposed. The seal member 60 may be an O-ring seal or the like that encircles the respective transmission port 28 or variator port 46.

INDUSTRIAL APPLICABILITY

The system may find applications in which two members are fluidly connected without the use of hoses. For example, the teachings herein may be used with power split CVT systems, or any other system that utilizes closed-loop hydraulic pump(s) and/or motor(s) (e.g., hydrostatic drive units, pumps mounted to fixed ratio gear boxes, etc.)

For illustration purposes, an exemplary application has been discussed herein for a power split transmission system 12 that includes a transmission 14 and a variator 16 operably connected via a working fluid circuit 20 where fluid is transferred between the portion of the working fluid circuit 20 disposed in the transmission 14 and the remaining portion of the working fluid circuit 20 disposed in the variator 16. The fluid in applicable applications may be under pressure or may be considered by those of skill in the art to be high pressure fluid.

As illustrated in the exemplary application discussed herein, the variator 16 is mounted (with fasteners 18) to the transmission 14 so that that the respective variator ports 46 (in the mounting joint variator face 32) and transmission ports 28 (in the mounting joint transmission face 26) are aligned and the respective fluid passageways 50 are formed.

Coupling of the variator channels 48 to the transmission channels 30 is done without the use of external hoses, which add cost and complexity to assembly and, with normal wear and tear over time, also may become potential leakage points. Each interface 62 between a transmission port 28 and a variator port 46 is sealed from leakage of the fluid via use of a seal member 60 disposed in a seal groove 58 that may be disposed in either the mounting joint variator face 32 or the mounting joint transmission face 26. When the seal member 60 is disposed in a seal groove 58 that is disposed in the mounting joint transmission face 26, the respective transmission port 28 is disposed in the opening 64 of the seal member 60 (e.g., the seal member 60 is disposed around the transmission port 28). Similarly, when the seal member 60 is disposed in a seal groove 58 that is disposed in the mounting joint variator face 32, the respective variator port 46 is disposed in the opening 64 of the seal member 60 (e.g., the seal member 60 is disposed around the variator port 46).

When the mounting joint variator face 32 is coupled with the mounting joint transmission face 26, the seal member 60 (disposed in the seal groove 58) is pressed between the mounting joint variator face 32 and the mounting joint transmission face 26 and seals the interface 62 between the transmission port 28 and the variator port 46 so that fluid is free to move through the associated fluid passageway 50 between the transmission port 28 and the variator port 46 but does not leak out of the fluid passageway 50 at the interface 62. The seal groove 58 radially surrounds the seal member 60 and retains the seal member 60 in the appropriate position.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A continuously variable transmission (CVT) system comprising:
   a transmission including a transmission housing, the transmission housing including:
      a mounting joint transmission face; and
      a plurality of transmission ports in the mounting joint transmission face, the plurality of transmission ports fluidly connected in a one-to-one correspondence to a plurality of transmission channels integral to the transmission housing; and
   a variator fluidly connected to the transmission by a working fluid circuit,
   the variator including a variator housing, the variator housing including:
      a mounting joint variator face coupled to the mounting joint transmission face; and
      a plurality of variator ports in the mounting joint variator face, the plurality of variator ports fluidly connected in a one-to-one correspondence to a plurality of variator channels integral to the variator housing,
      wherein the plurality of variator ports are directly fluidly connected in a one-to-one and axial alignment correspondence to the plurality of transmission ports without the use of one or more external hoses or tubes to directly fluidly connect the plurality of variator ports to the plurality of transmission ports,
      wherein each of the plurality of transmission ports is on the mounting joint transmission face,
      wherein each of the plurality of variator ports is on the mounting joint variator face, and
      wherein the continuously variable transmission (CVT) system is a power split transmission system.

2. The system of claim 1, wherein the variator further includes a hydraulic pump or motor fluidly connected to the working fluid circuit.

3. The system of claim 1, wherein the mounting joint variator face is coupled to the mounting joint transmission face by one or more fasteners.

4. The system of claim 1, in which the working fluid circuit includes a first fluid passageway configured to conduct fluid between the transmission and the variator, the first fluid passageway comprising:
   a first transmission channel fluidly connected to a first transmission port; and
   a first variator channel fluidly connected to a first variator port,
   wherein the first transmission port and the first variator port are fluidly connected without use of external hoses or tubes between the first transmission port and the first variator port.

5. The system of claim 4, in which the variator further includes a pump fluidly connected to the working fluid circuit, and an actuator fluidly connected to the working fluid circuit and mechanically connected to the pump, the actuator configured to activate/deactivate the pump,
   wherein the first fluid passageway is configured to provide fluid for actuation control flow for the actuator.

6. The system of claim 4, wherein the first fluid passageway is configured to conduct fluid to the variator to replenish fluid in the working fluid circuit.

7. The system of claim 4, wherein the first fluid passageway is configured to conduct fluid for cooling of the variator housing or lubrication of a bearing.

8. The system of claim 4 further comprising a seal between the mounting joint transmission face and the mounting joint variator face, the seal configured to seal an interface between the first transmission port and the first variator port.

9. A variator for use with a continuously variable transmission comprising:
   a variator housing, the variator housing including:
      a mounting joint variator face configured to be coupled to a mounting joint transmission face of the transmission; and
      a plurality of variator ports disposed in the mounting joint variator face, the plurality of variator ports fluidly connected in a one-to-one correspondence to a plurality of variator channels integral to the variator housing,
      wherein the plurality of variator ports are configured to be axially aligned with and directly fluidly connected in a one-to-one correspondence to a plurality of transmission ports in the mounting joint transmission face without the use of external hoses or tubes to directly fluidly connect the variator ports to the transmission ports,
      wherein each of the plurality of transmission ports is on the mounting joint transmission face, and
      wherein each of the plurality of variator ports is on the mounting joint variator face.

10. The variator of claim 9, wherein a first variator port of the plurality of variator ports is directly fluidly connected to a first variator channel of the plurality of variator channels, the first variator channel configured to conduct fluid to or from the first variator port.

11. The variator of claim 10, in which the variator further includes an actuator mechanically connected to a variable displacement pump, the actuator configured to activate/deactivate the variable displacement pump, wherein the first variator channel is configured to provide fluid for actuation control flow for the actuator.

12. The variator of claim 10, wherein the first variator channel is configured to provide fluid to the first variator port to replenish fluid lost or leaked from a working fluid circuit disposed in the transmission.

13. The variator of claim 10, wherein the first variator channel is configured to receive fluid from a first transmission port for cooling of the variator housing.

14. The variator of claim 10, in which the variator further includes an actuator configured to activate/deactivate a hydraulic motor, wherein the first variator channel is configured to provide fluid for actuation control flow for the actuator.

15. A continuously variable transmission comprising:
   a transmission housing, the transmission housing including:
      a mounting joint transmission face configured to be coupled to a mounting joint variator face of a variator;
      a plurality of seal grooves disposed in the mounting joint transmission face;
      a plurality of transmission ports disposed in a one-to-one correspondence in the plurality of seal grooves, the plurality of transmission ports fluidly connected in a one-to-one correspondence to a plurality of transmission channels integral to the transmission housing,
      wherein the plurality of transmission ports are configured to be axially aligned with and directly fluidly connected in a one-to-one correspondence to a plurality of variator ports in the mounting joint variator face without the use of external hoses or tubes to directly fluidly connect the transmission ports to the variator ports; and a plurality of seal members in a one-to-one correspondence in the plurality of seal grooves, each seal member configured to seal an interface between one of the plurality of transmission ports and one of the plurality of variator ports, wherein each of the plurality of transmission ports is on the mounting joint transmission face, and wherein each of the plurality of variator ports is on the mounting joint variator face.

16. The transmission housing of claim 15, wherein a first transmission port of the plurality of transmission ports is directly fluidly connected to a first transmission channel of the plurality of transmission channels, the first transmission channel configured to conduct fluid to or from the first transmission port.

17. The transmission housing of claim 16, in which the transmission further includes one or more clutch members, wherein the first transmission channel is configured to receive from a first variator port fluid for the actuation of one or more clutch members.

18. The transmission housing of claim 16, wherein the first transmission channel is configured to receive fluid from a first variator port.

19. The transmission housing of claim 16, wherein the first transmission channel is configured to provide fluid to a first variator port for cooling of a variator housing.

20. The transmission housing of claim 16, wherein the first transmission channel is configured to provide fluid for lubrication of one or more bearings operably coupled to a motor shaft or a pump shaft of the variator.

* * * * *